United States Patent
Parikh et al.

(10) Patent No.: US 8,280,871 B2
(45) Date of Patent: Oct. 2, 2012

(54) IDENTIFYING OFFENSIVE CONTENT USING USER CLICK DATA

(75) Inventors: Jignashu Parikh, Gujarat (IN); Bipin Suresh, Karnataka (IN)

(73) Assignee: Yahoo! Inc., Sunnyvale, CA (US)

( * ) Notice: Subject to any disclaimer, the term of this patent is extended or adjusted under 35 U.S.C. 154(b) by 320 days.

(21) Appl. No.: 11/713,212

(22) Filed: Mar. 2, 2007

(65) Prior Publication Data

US 2008/0162540 A1    Jul. 3, 2008

(30) Foreign Application Priority Data

Dec. 29, 2006    (IN) .................. 2836/DELNP/2006

(51) Int. Cl.
*G06F 17/00*    (2006.01)
(52) U.S. Cl. ........................................ 707/708
(58) Field of Classification Search .................. None
See application file for complete search history.

(56) References Cited

U.S. PATENT DOCUMENTS

| | | | |
|---|---|---|---|
| 5,678,041 A * | 10/1997 | Baker et al. ................. 707/9 |
| 6,182,081 B1 * | 1/2001 | Dietl et al. .................. 707/102 |
| 6,266,664 B1 * | 7/2001 | Russell-Falla et al. ........ 707/5 |
| 6,295,559 B1 * | 9/2001 | Emens et al. ............... 709/225 |
| 6,336,117 B1 * | 1/2002 | Massarani ................... 707/100 |
| 6,493,744 B1 * | 12/2002 | Emens et al. ............... 709/203 |
| 6,907,423 B2 * | 6/2005 | Weil et al. ................... 707/3 |
| 6,976,070 B1 * | 12/2005 | Hoashi et al. ............... 709/224 |
| 7,225,180 B2 * | 5/2007 | Donaldson et al. ............ 707/3 |
| 7,299,222 B1 * | 11/2007 | Hogan et al. .................. 707/3 |
| 7,346,839 B2 * | 3/2008 | Acharya et al. ........ 707/999.003 |
| 7,467,298 B2 * | 12/2008 | Mitchell et al. ............. 713/168 |
| 7,523,103 B2 * | 4/2009 | Goel et al. ................... 707/3 |
| 7,558,805 B2 * | 7/2009 | Goel .......................... 707/102 |
| 2005/0071741 A1 * | 3/2005 | Acharya et al. ............. 715/500 |
| 2005/0256848 A1 * | 11/2005 | Alpert et al. ................ 707/3 |
| 2006/0004716 A1 * | 1/2006 | Hurst-Hiller et al. .......... 707/3 |
| 2007/0198530 A1 * | 8/2007 | Takahashi et al. ............ 707/10 |
| 2008/0097969 A1 * | 4/2008 | Lee et al. ............... 707/999.003 |

* cited by examiner

*Primary Examiner* — Neveen Abel Jalil
*Assistant Examiner* — Jacques Veillard
(74) *Attorney, Agent, or Firm* — Hickman Palermo Truong Becker Bingham Wong LLP

(57) ABSTRACT

Techniques are provided for designating an item as being of a particular type when the item has been selected after being returned in response to a search and by identifying which mode, of a plurality of modes, in which the search engine was operating when the item was selected.

20 Claims, 7 Drawing Sheets

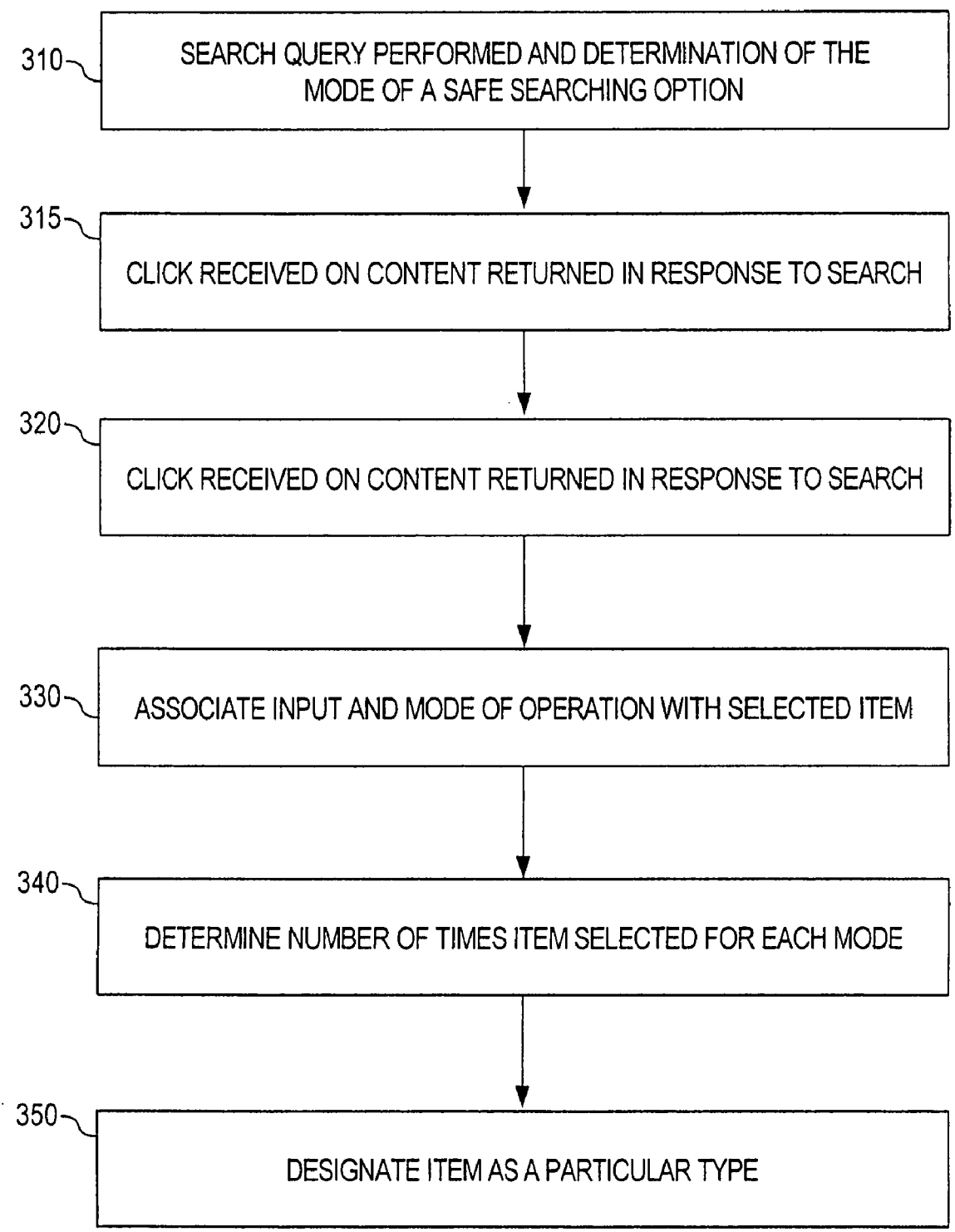

IDENTIFYING OFFENSIVE CONTENT USING USER CLICK DATA

RELATED APPLICATION DATA

This application is related to and claims the benefit of priority from Indian Patent Application No. 2836/DELNP/2006, entitled "Identifying Offensive Content Using User Click Data," filed Dec. 29, 2006, the entire disclosure of which is incorporated by reference as if fully set forth herein.

FIELD OF THE INVENTION

The present invention relates to Internet searching and, more specifically, to identifying potentially offensive content related to Internet searching.

BACKGROUND

As the amount of media content, such as images, videos and sound files, proliferates on the Internet, users have begun to rely more heavily on Internet search engines to locate and view content in which they are interested. Web sites such as Yahoo and Google offer the capability to search for links to content on the Internet that is deemed relevant to a search query, such as web pages and multimedia, among other categories. In response to a query, the web site performing the search query may display content extracted from other web sites in addition to links to content.

One problem faced by web sites that offer multimedia search capability is the likelihood of displaying content or returning results linking to multimedia content that could be categorized as inappropriate or offensive. For example, a user searching for images or movies containing live concert footage for a particular celebrity may not desire to see nude pictures of the celebrity along with live concert photographs.

One approach to screening out content that may be inappropriate or offensive is to use automated tools to identify the content in an image or other multimedia content. One drawback to automated approaches is that the definition of what is inappropriate or offensive is very difficult to describe to a machine. For example, a cartoon containing an image of a religious figure may be perfectly acceptable to people who do not subscribe to that religion, but offensive to people who do. Traditional automated techniques for identifying offensive content, as described further below, would likely not be able to flag the cartoon as offensive with any degree of accuracy One automated approach to identifying offensive images that may be returned in response to a search query is to detect the presence of large amounts of human skin in an image. The rationale behind this approach is that pornographic images and other types of sexually inappropriate images contain bare skin. A drawback to this approach is the large number of false positives; for example, a family photograph taken at a beach, where the family members are wearing bathing suits, would not qualify as pornographic, but may be identified as a pornographic image because of the high amount of skin content in the image. Also, this approach is very resource intensive with regard to processor usage and time.

Another automated approach to determining whether content returned in response to a search query is inappropriate is for any text associated with the content, such as captions, tags, or any text displayed in proximity to the content, to be scanned for particular words that may indicate inappropriate content. For example, an image with the words "nude" or "sexy" associated with the image may be flagged as inappropriate, and an image with inappropriate words associated with the image may likewise be flagged. A problem with this approach is that the text may not indeed by associated with the particular image, or an inappropriate image or video may have nonoffensive text associated with it in a deliberate attempt to thwart these approaches.

Another approach is for human editors to manually screen all content that may be returned in response to a search query and flag items that are inappropriate. This offers a higher degree of accuracy over the automated approaches, because humans are generally effective at identifying inappropriate content, but this approach is not efficient and relies on human biases that may not be true in all parts of the world where users are searching for content.

Therefore, an approach for identifying potentially inappropriate content that may be returned in response to an Internet search, which does not experience the disadvantages of the above approaches, is desirable. The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DESCRIPTION OF THE DRAWINGS

The present invention is illustrated by way of example, and not by way of limitation, in the figures of the accompanying drawings and in which like reference numerals refer to similar elements and in which:

FIG. 3 is a flowchart illustrating the functional steps of designating content as a particular type using user click data according to an embodiment;

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

Techniques are provided for designating an item as being of a particular type when the item has been returned in response to a search and selected after being returned, by identifying which mode, of a plurality of modes, in which the search engine was operating when the search query was made or when the item was selected.

According to an embodiment, items are returned in response to a search that was performed while the search engine was operating in a particular mode of a plurality of modes. One if the items is selected, such as being clicked on, and an indication is made that the item was selected from results provided by a search performed while the search engine was in the particular mode. For each mode, the number of times the item has been selected, either within a defined period or total, is determined and based on the determination, the item is designated as a particular type.

According to an embodiment, the mode of a safe searching option provided by a search engine is determined. Items are provided in response to a search wherein each item may be associated with a unique identifier and the safe searching option is in a particular mode. Input is received comprising a selection of one of the items, the input and the safe searching mode is associated with the selected item, and for at least one mode of the safe searching option, the number of times the item has been selected is determined. Based on the determination, the item is designated as a particular type.

According to an embodiment, input is received comprising a search query that was performed while the search engine was operating in a particular mode of a plurality of modes. An indication that the search query was received while the particular mode was in operation is recorded, and the number of times the search query was received in at least one of the modes is determined, and based on the determination, the search query is designated as a particular type.

Architectural Overview

Figure 1:
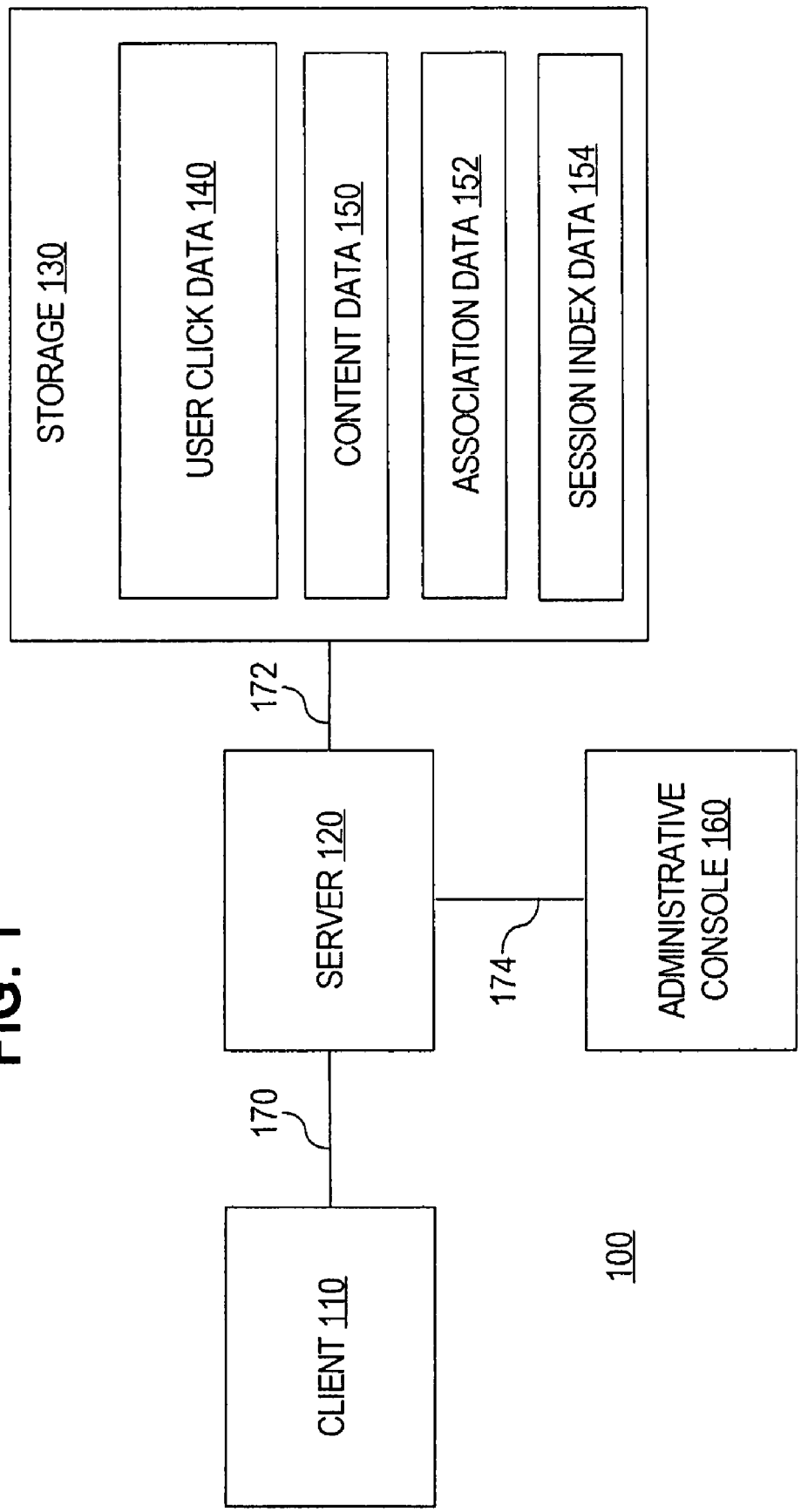
FIG. 1 is a block diagram of a system according to an embodiment of the invention.

FIG. 1 is a block diagram of a system 100 according to an embodiment of the invention. Embodiments of system 100 may be used to identify potentially offensive content in accordance with an embodiment of the invention.

In the embodiment depicted in FIG. 1, system 100 includes client 110, server 120, storage 130, user click data 140, content data 150, association data 152, session index data 154, and an administrative console 160. While client 110, server 120, storage 130, and administrative console 160 are each depicted in FIG. 1 as separate entities, in other embodiments of the invention, two or more of client 110, server 120, storage 130, and administrative console 160 may be implemented on the same computer system. Also, other embodiments of the invention (not depicted in FIG. 1), may lack one or more components depicted in FIG. 1, e.g., certain embodiments may not have a administrative console 160, may lack a session index 154, or may combine one or more of the user click data 140, content data 150, association data 152, and a session index data 154 into a single index or file.

Client 110 may be implemented by any medium or mechanism that provides for sending request data, over communications link 170, to server 120. Request data specifies a search query that may contain terms about which the user desires to find content on the Internet.

The server, after processing the request data, will transmit to client 110 response data that returns content identified as relevant for a particular query. While only one client 110 is depicted in FIG. 1, other embodiments may employ two or more clients 110, each operationally connected to server 120 via communications link 170, in system 100. Non-limiting, illustrative examples of client 110 include a web browser, a wireless device, a cell phone, a personal computer, a personal digital assistant (PDA), and a software application.

Server 120 may be implemented by any medium or mechanism that provides for receiving request data from client 110, processing the request data, and transmitting response data that identifies the content identified as relevant for a particular query to client 110.

Storage 130 may be implemented by any medium or mechanism that provides for storing data. Non-limiting, illustrative examples of storage 130 include volatile memory, non-volatile memory, a database, a database management system (DBMS), a file server, flash memory, and a hard disk drive (HDD). In the embodiment depicted in FIG. 1, storage 130 stores the user click data 140, content data 150, association data 152, and session index data 154. In other embodiments (not depicted in FIG. 1), the user click data 140, content data 150, association data 152, and session index data may be stored across two or more separate locations, such as two or more storages 130.

User click data 140 represents data recording each time a user clicks on content returned in response to a search. According to an embodiment, this is a user click log and is accomplished by recording the click and associating the click with the unique identifier associated with the item clicked upon, as described further herein. For example, if a search returns a link to a web page and an image, and the user clicks on the image, the user click data 140 will record that the particular image was clicked. If the user then returns to the search results and clicks the link to a web page, the user click data 140 will record that the particular link was clicked. Content data 150 represents data that may be returned in response to a search. According to an embodiment, the content data 150 is indexed to provide faster retrieval in response to a search query. Each item in content data 150, whether it be a link, image, video, audio file, or other data, has a unique identifier associated with the item and has an "offensive" flag associated with the item. For example, an image is stored in content data 150 along with its unique identifier and a flag that indicates whether the image should be returned in response to a search when the search is performed with an option to filter out offensive results. Association data 152 may serve as a primary or secondary storage for the associations described herein, for example the unique identifier associated with an item in the content data 150 or the "offensive" flag associated with an item in the content data 150, or the associations between a user click stored in user click data 140 and the content clicked upon stored in content data 150. Session index data 154 is an index that may be used to determine which content data 150 and what queries was requested and/or made by a particular user.

Administrative console 160 may be implemented by any medium or mechanism for performing administrative activities in system 100. For example, in an embodiment, administrative console 160 presents an interface to an administrator, which the administrator may use to add to, remove or modify data in the user click data 140, add to, remove or modify content from the content data 140, add to, remove or modify data in the association data 152, or create an index (such as session index 154) on storage 130, or configure the operation of server 120.

Figure 2A:
FIG. 2A is a block diagram illustrating an example of a web page by which a user or agent may perform Internet search queries in accordance with an embodiment.

Communications link 170 may be implemented by any medium or mechanism that provides for the exchange of data between client 110 and server 120. Communications link 172 may be implemented by any medium or mechanism that provides for the exchange of data between server 120 and storage 130. Communications link 174 may be implemented by any medium or mechanism that provides for the exchange of data between administrative console 160, server 120, and storage 130. Examples of communications links 170, 172, and 174 include, without limitation, a network such as a Local Area Network (LAN), Wide Area Network (WAN), Ethernet or the Internet, or one or more terrestrial, satellite or wireless links Identifying Offensive Content Using User Click Data FIG. 2A is a block diagram 200 illustrating an example of a web page through which a user or agent may perform Internet search queries in accordance with an embodiment. FIG. 2A illustrates a page at www.yahoo.com. A search input area 202 is displayed in which a user may type terms comprising a search query. For example, in FIG. 2A, the term "baseball" is displayed in the search input area 202, representing the term for which the user desires to search. By selecting the terms "Web" 204, "Images" 206, "Video" 208 and the like, a user may restrict the results returned in response to the search to particular types of items, such as links to web pages, image data, and video data. In the example illustrated in FIG. 2A, when the search button 210 is activated, results satisfying the search query "baseball" will be located and displayed to the user.

Figure 2B:
FIG. 2B is a block diagram illustrating an example of displaying search query results on a web page according to an embodiment.

FIG. 2B is a block diagram 220 illustrating an example of displaying search query results on a web page according to an embodiment of the invention. In FIG. 2B, the search button 210 has been activated with the search term "baseball" in the search input area 202 and the search restricted to images, although the search could have been unrestricted to any particular data type or restricted to a type such as video or audio data, as described above.

According to an embodiment, the search results 250 comprise a display of images obtained from a web page, and the images may comprise links to the original location of the image. According to an embodiment, a safe searching option is provided whereby items that are deemed offensive, for example pornography, are not returned in response to a search. In FIG. 2B, this option is designated "SafeSearch" and a link 260 is provided to set parameters for the "SafeSearch" option; for example, to turn "SafeSearch" on or off. While the option to filter Internet search results based on the potential presence of offensive content is referred to herein as "SafeSearch" or a safe searching option, it should be understood that these terms are for illustrative purposes only and should not be construed as a limitation upon any embodiment of the invention.

Figure 2C:
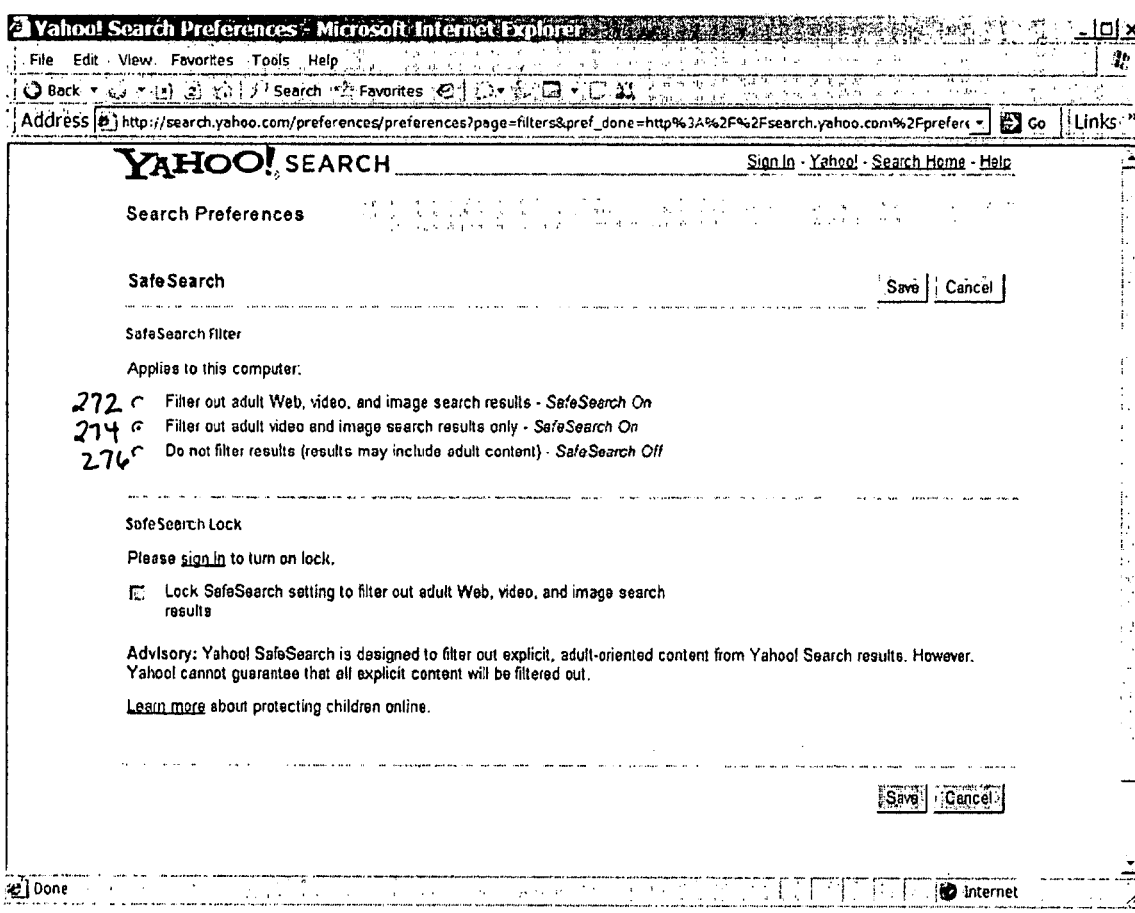
FIG. 2C is a block diagram illustrating an example embodiment for setting parameters for a safe searching option according to an embodiment.

FIG. 2C is a block diagram 270 illustrating an example embodiment for setting parameters for a safe searching option. By receiving user input, the option to exclude potentially offensive results from search queries may be activated for all searches 272, activated for a subset of data types 274, or deactivated 276. According to an embodiment, a SafeSearch option is enabled by default and may be disabled in response to user input.

According to an embodiment, the SafeSearch option is a flag associated with a search query that determines whether content, such as links to web pages, text, images, video data and audio data identified as potentially offensive, are returned as a result of a search query. According to an embodiment, content is flagged as being potentially offensive and this flag is checked when the content is identified as responsive to a search query. If the SafeSearch option is activated, and the content is flagged as being potentially offensive, then the content is filtered out of the search results prior to the results being presented. According to an embodiment, user input may be received to override the filtering of search results. If a SafeSearch option is deactivated, then no filtering of the search results is performed and the content is not checked to determine the status of the flag associated with the content that identifies the content as being potentially offensive.

According to an embodiment, a user is presented with a web page displaying the results of a search query. This web page may comprise one or more types of content, such as hyperlinks to web pages or digital images that may be displayed in full or thumbnail view and may also serve as a hyperlink to the original image data on the Internet, such as on a web page. For example, in FIG. 2B, a user may click on the image 252 identified as "baseball.jpg" to view the image on the web page where it was originally displayed. Similarly, a user may click on a link returned in response to a web query. In response to this click on the "baseball.jpg" image 252, or a click on any content returned in response to a search, the click is stored and associated with the content being clicked. According to an embodiment, each piece of content returned in response to a search 250 has a unique identifier associated with the content, whether it be a hyperlink, an image, a video, or other data. This allows the number of times a piece of content has been clicked to be calculated.

According to an embodiment, the number of times a particular piece of content has been clicked with a SafeSearch option activated and deactivated is stored in a user click log. This information about the content clicked when a SafeSearch option was activated and the content users clicked when a SafeSearch option was deactivated is stored. According to an embodiment, this information is used to automatically identify potentially offensive content by analyzing the information to determine if the content has been clicked many times with a SafeSearch option off rather than on, thereby resulting in a greater probability that the content is likely to be potentially offensive.

According to an embodiment, it is assumed that users have a higher probability of clicking on content that is potentially offensive when a SafeSearch option is deactivated than when a SafeSearch option is activated. This assumption is strengthened when a SafeSearch option is activated by default for all Internet searches, so that a user must explicitly deactivate the SafeSearch option in order to receive a larger set of results that may include more content that is potentially offensive. Not all potentially offensive content may be filtered by activating a SafeSearch option, so there will still be clicks on potentially offensive material with a SafeSearch option activated. If a user desires to search for potentially offensive content, for example pornography, then better search results will be obtained by deactivating a SafeSearch option because no content will be filtered.

According to an embodiment, a factor is calculated that indicates whether content is potentially offensive. This factor may be expressed for each piece of content capable of being uniquely identified as "alpha (S, NS)", where alpha is a function, such as a simple ratio or a more complicated function, S is the number of clicks the content received after being presented as part of a set of search results where a SafeSearch option was activated, and NS is the number of clicks the same content received after being presented as part of a set of search results where a SafeSearch option was deactivated. This factor results in a score value that is used to designate the content as potentially offensive or not.

According to an embodiment, this approach will identify most content that has already been identified as potentially offensive and will also identify content that is nonoffensive yet receives clicks when a SafeSearch option is deactivated. According to an embodiment, an upper threshold U and lower threshold L is used to address the former and latter case.

According to an embodiment, based on the score value, content is designated as potentially offensive or potentially flagged for further review by a human editor or by an automated process to determine whether the content is offensive or not. An embodiment of the approach allows a fully automated approach or combination of an automated and manual approach to identifying potentially offensive content that does not suffer from the disadvantages as discussed herein.

According to an embodiment, the approaches described herein may be used to determine whether a search query is potentially offensive or will return results including potentially offensive content. For example, each query is stored and associated with a unique identifier, or queries that are substantially similar may be grouped together and associated with a unique identifier. The number of times the query has been executed with a SafeSearch option activated and deactivated is stored and processed as described herein. According to an embodiment, any content, whether it be a query, text, image data, video data or other data, may be determined to be potentially offensive where the number of times the data is selected or trackable input is received associated with the content can be stored and identified as occurring with a SafeSearch option activated or deactivated.

According to an embodiment, when a potentially offensive query is received, feedback may be provided to a user, in the form of text displayed on a display, for example, that the user has entered a query which may return potentially offensive results, and if the user desires to receive the potentially offensive results, then the user should deactivate the SafeSearch option. According to an embodiment, digital images returned in response to a query identified as potentially offensive are likely to be potentially offensive and may be identified as such as a result of the approaches described herein.

FIG. 3 is a flowchart 300 illustrating the functional steps of identifying potentially offensive content based on user click data according to an embodiment of the invention. The particular sequence of steps illustrated in FIG. 3 is merely illustrative for purposes of providing a clear explanation. Other embodiments of the invention may perform all or a subset of the various steps of FIG. 3 in parallel or in a different order than that depicted in FIG. 3.

Initially, in step 310, an Internet search query is performed and results provided whereby a safe searching option, herein known as SafeSearch, is in one of several modes is provided. According to an embodiment, a safe searching option is associated with a search engine and the search engine or the safe searching option operates in one of several possible modes. For example, one mode may be designed to filter out offensive content, while another mode may be to not filter content. While embodiments have been described in association with filtering offensive content, another embodiment may include the search engine or an associated option operating in alternate modes such as a "shopping" mode and a "research" mode, wherein items may be browsed in one or more of the possible modes. According to an embodiment, the number of clicks an item receives while the search engine or associated option is in a one mode, such as a shopping mode, may be compared with the number of clicks an item receives while in another mode, such as a research mode, and by comparing the respective clicks, the item may be designated as a particular type.

According to an embodiment, each piece of content comprising the results is associated with a unique identifier. In step 315, items are returned in response to a search, where each item is associated with a unique identifier as described herein and the search is performed while the search engine or safe searching option is in a particular mode. In step 320, input is received comprising a click, or selection, of one of the pieces of content comprising the results. For example, in response to a query, a set of images or links may be returned, each image and/or link capable of being selected by a mouse click, keyboard input, or other input. If input associated with one of the pieces of content is received; for example, one of the images is clicked on, then the image may be displayed at full size or the user may be taken to a web page where the image was originally displayed. According to an embodiment, the content returned as a result of a search query is stored and indexed on a server that is not the actual server where the content is stored. For example, an image may be retrieved by a "web spider" process or indexing process and stored for use in response to queries, because to open connections to every server on which a query result is stored in order to display the result would be inefficient.

In step 330, the input and mode of operation is associated with the selected item. For example, the unique identifier of the content clicked upon is stored along with the mode of the search engine or safe searching option that was active when the search was performed. According to an embodiment, user click logs are stored and associated to a piece of content, such as an image data file, by a unique identifier. Because each piece of content has a unique identifier, it may be accessed each time the content is clicked in response to a search along with whether the SafeSearch option is on or off. According to an embodiment, each click on a piece of content returned in response to a query is stored along with whether the SafeSearch option was activated or not. These numbers are associated with the content. In step 340, for each possible mode of operation, the number of times the item has been selected is determined.

In step 350, the item is designated as a particular type based on the number of times the item has been selected in one or more of the various modes. For example, a first number of times the content has been clicked with the SafeSearch option activated and a second number of times the content has been clicked with the SafeSearch option deactivated is analyzed and used to determine a third number. According to an embodiment, this third number is a score value. According to an embodiment, this is accomplished by processing the number of times the content has been clicked with the SafeSearch option activated and the number of times the content has been clicked with the SafeSearch option deactivated through a function. According to an embodiment, the function could be a simple ratio; for example, the number of times the content has been clicked with the SafeSearch option activated as the numerator and the number of times the content has been clicked with the SafeSearch option deactivated as the denominator, or the number of times the content has been clicked with the SafeSearch option activated or deactivated as the numerator and the total number of times the content has been clicked as the denominator.

Because content that has received three clicks could have the same ratio as content with 3000 clicks, it may be desirable to normalize the function so as to reflect the assumption that the more clicks tracked for a piece of content, the more accurate the designation will be. Therefore, according to an embodiment, the function could be: $R=U/(U+S)$, where R is the ratio, U is the number of times the content has been clicked with the SafeSearch option deactivated (representing offensive clicks), and S is the number of times the content has been clicked with the SafeSearch option activated (representing nonoffensive clicks). Given that $A=(U+S)$, then a score value may be calculated by the following: $SCORE=\log(\log(A)*\log(2*R))$, where log is a logarithmic function.

According to an embodiment, the function or functions may be adjusted automatically or based on user input to provide a stricter or less strict determination of what content is potentially offensive.

For example, the third number, such as a ratio or score value, is used to determine whether the content is potentially offensive, and if so, then the content is designated as potentially offensive. Based on the result, the content could be designated as potentially offensive and/or identified for further analysis, for example by a human. According to an embodiment, the ratio is a number between 0 and 1, and the ratio is compared to a threshold value ranging from 0 to 1. If the ratio is higher than the threshold, then the content is designated as offensive.

As an example, if a particular piece of content has been clicked 2000 times with the SafeSearch option activated and 1000 times with the SafeSearch option deactivated (for a total of 5000 clicks), one ratio would be 2000/3000, or approximately 0.67. The 0.67 could be the score value, or the 0.67 could be used to determine a score value, for example as described in paragraph 49. Assuming the 0.67 is the score value, and a specified threshold is defined as any ratio under 0.85 should designate the piece of content as nonoffensive, then the piece of content will be designated as nonoffensive and data reflecting this designation will be stored with the content, for example in a flag associated with the content. According to an embodiment, if a piece of content is designated as being potentially offensive, then a flag is associated with the content and is checked in response to the content being identified as relevant to a query. If the flag is on, and the SafeSearch option is activated, then the content will be filtered from the search results prior to being presented.

Figure 4:
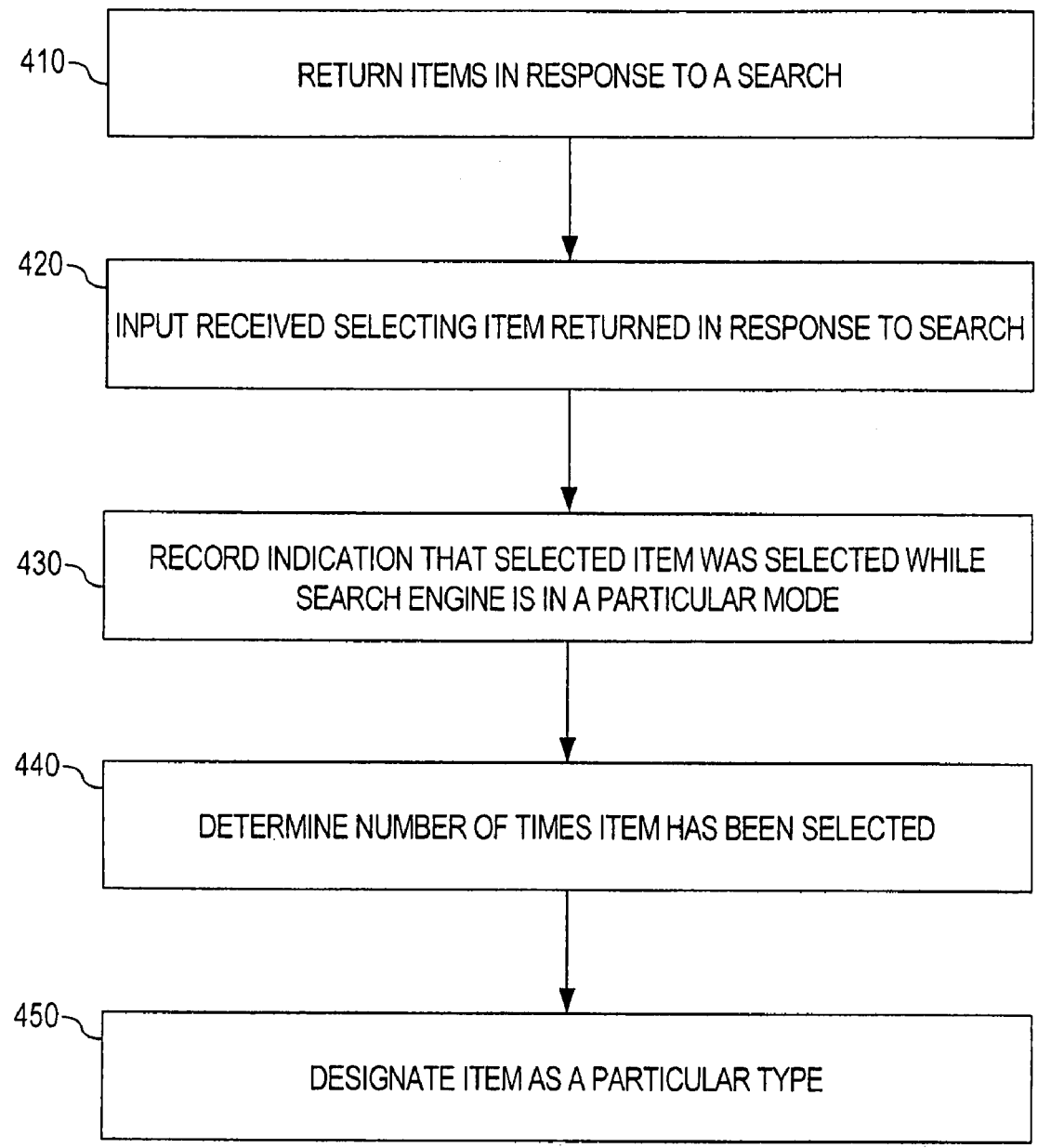
FIG. 4 is a flowchart illustrating the functional steps of designating content as a particular type using user click data according to an embodiment.

FIG. 4 is a flowchart 400 illustrating the functional steps of identifying potentially offensive content based on user click data according to an embodiment of the invention. The particular sequence of steps illustrated in FIG. 4 is merely illustrative for purposes of providing a clear explanation. Other embodiments of the invention may perform all or a subset of the various steps of FIG. 4 in parallel or in a different order than that depicted in FIG. 4.

Initially, in step 410, items are returned in response to a search that was performed while the search engine was operating in one of a plurality of modes. For example, one of the modes may be to attempt to filter offensive material, while another mode may be not to filter out offensive material. The modes should not be so limited, however, as any type of mode is envisioned wherein the mode may be associated with a search and associated with items clicked on as a result of the search. In step 420, input is received selecting one of the items returned as a result of the search. For example, a mouse click on an item such as an image or hyperlink, or keyboard input selecting an item, or any other type of activity whereby a particular item is chosen or activated.

In step 430, an indication that the selected item was selected from results of a search performed while the search engine was in a particular mode is determined and recorded. The results may be saved to storage and associated with the selected item. For example, each click or selection may be stored in a "click log" from which it is capable of determining which click was received on which item and which mode was operational at the time.

In step 440, the number of times the item has been selected is determined for at least one of each possible mode of operation. According to an embodiment, the number of times may be within a specified period or the total number of times. The specified period may be user-defined, for example in response to user input. For example, the number of clicks on an item while the search engine was in a mode of filtering potentially offensive content is determined and the number of clicks on the same item while the search engine was in a mode of not filtering potentially offensive content are determined.

According to an embodiment, the determination may include comparing the number of times the selected item has been selected while the search engine or safe searching option was operating in one or more particular modes to the total number of times the item has been selected or the number of times the selected item has been selected while the search engine or safe searching option was operating in one or more particular modes, and based on the comparison, the item may be designated as a particular type, such as offensive. For example, the search engine or safe searching option may have four available modes, A, B, C, and D. The number of times an item is clicked while the search engine is operating in modes A and B may be compared to the total number of times the item has been clicked, or the number of times an item is clicked while the search engine is operating in modes C and D. Any number of variations is envisioned.

According to an embodiment, the determination may include calculating a ratio of the number of times the selected item has been selected while the search engine or safe searching option was operating in one or more particular modes to the total number of times the item has been selected, and based on the ratio, the item may be designated as a particular type, such as offensive. For example, the ratio may be compared to a baseline value or the ration of another item.

According to an embodiment, the determination may include comparing the number of times the selected item has been selected while the search engine or safe searching option was operating in one or more particular modes to the total number of times the item has been selected or the number of times the selected item has been selected while the search engine or safe searching option was operating in one or more particular modes, and based on the comparison, calculating or determining a score value that may be compared to another score value or a threshold value.

According to an embodiment, the determination may include processing the number of times the selected item has been selected while the search engine or safe searching option was operating in one or more particular modes and the total number of times the item has been selected or the number of times the selected item has been selected while the search engine or safe searching option was operating in one or more particular modes, through a function. According to an embodiment, the input of the function, the output of the function, or the function may be smoothed, such as applying a logarithmic function or other type of alteration.

In step 450, based on the determination, the selected item is designated as a particular type; for example, potentially offensive or not. The item may be designated as requiring further analysis, for example by a human, in order to determine a particular characteristic of the item. Based on the determination, the item may be removed from a particular category, such as offensive, or flagged as offensive where before it was not so flagged. As an example, the item may be designated as a particular type based on the output of a function, calculating or determining a score value that may be compared to another score value or a threshold value, or simply based on a value.

Implementing Mechanisms

Figure 5:
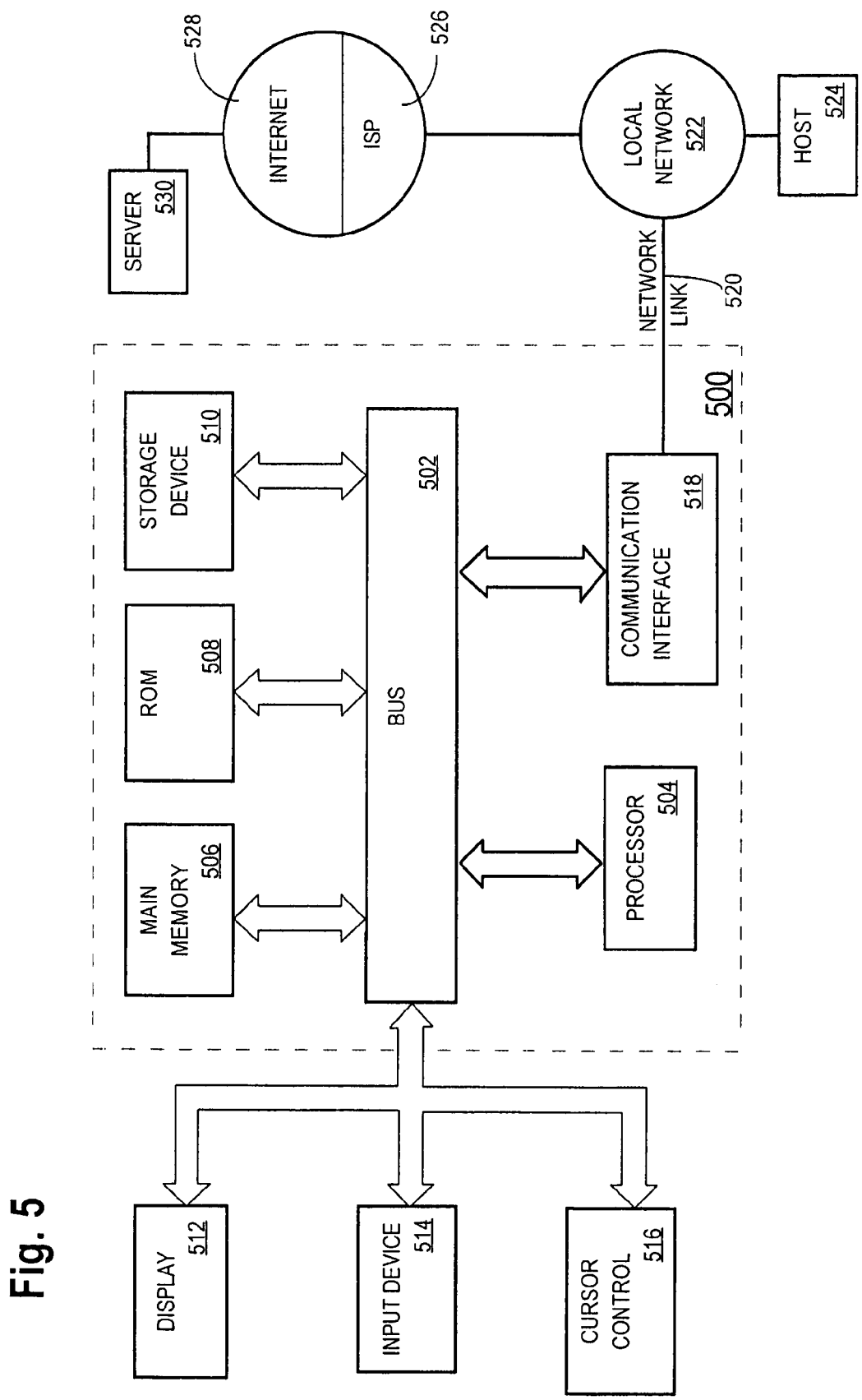
FIG. 5 is a block diagram of a computer system upon which embodiments of the invention may be implemented.

FIG. 5 is a block diagram that illustrates a computer system 400 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising steps of:
returning, as search results, items in response to a search that was performed while the search engine was operating in a particular mode of a plurality of operational modes;
wherein the plurality of operational modes includes (a) a mode that is designed to filter offensive material and (b) a mode that is designed not to filter offensive material;
receiving input comprising a user selection of one of the items from the search results;
recording an indication that the selected item was selected from results of a search performed while the search engine was in the particular mode;
for each particular mode of the plurality of modes, determining the number of times the selected item has been selected from results of searches conducted in that particular mode;
calculating a ratio of (a) a number of times that the selected item was selected from results of searches conducted while the search engine was in the mode in which offensive material was being filtered from search results to (b) a number of times that the selected item was selected from results of searches conducted while the search engine was in the mode in which offensive material was not being filtered from search results; and
in response to a determination that the ratio is less than a specified threshold, storing data that indicates that the selected item is an offensive item that will be filtered out from results of future searches conducted while the search engine is in the mode in which offensive material is filtered from search results;
wherein said steps are performed by one or more computing devices.

2. The method of claim 1 wherein the items are digital images.

3. A volatile or non-volatile non-transitory machine-readable storage medium storing instructions which, when executed by one or more processors, cause the one or more processors to perform steps as recited in claim 2.

4. The method of claim 1 wherein the items are hyperlinks.

5. A volatile or non-volatile non-transitory machine-readable storage medium storing instructions which, when executed by one or more processors, cause the one or more processors to perform steps as recited in claim 4.

6. A volatile or non-volatile non-transitory machine-readable storage medium storing instructions which, when executed by one or more processors, cause the one or more processors to perform steps as recited in claim 1.

7. The method of claim 1, wherein the mode in which offensive material is not filtered from search results is not a selected mode by default, and does not become an active mode until a user indicates that the user desires to view search results from which offensive material has not been filtered.

8. A volatile or non-volatile non-transitory machine-readable storage medium storing instructions which, when executed by one or more processors, cause the one or more processors to perform steps as recited in claim 7.

9. The method of claim 1, wherein the input is a first input, further comprising receiving a second input to change an active mode of the search engine from one of (a) the mode that is designed to filter offensive material or (b) the mode that is designed not to filter offensive material, to another of (a) the mode that is designed to filter offensive material or (b) the mode that is designed not to filter offensive material.

10. A volatile or non-volatile non-transitory machine-readable storage medium storing instructions which, when executed by one or more processors, cause the one or more processors to perform steps as recited in claim 9.

11. The method of claim 1, wherein the specified threshold is a first threshold, further comprising:
performing the steps of receiving, recording, determining, and calculating for a plurality of items, in response to searches that were performed while the search engine was operating in particular modes of the plurality of operational modes;
in response to a determination that a calculated ratio for a particular item of the plurality of items is greater than a second threshold, storing data that indicates that the particular item is not an offensive item and will not be filtered from results of future searches conducted while the search engine is in the mode in which offensive material is filtered from search results.

12. A volatile or non-volatile non-transitory machine-readable storage medium storing instructions which, when executed by one or more processors, cause the one or more processors to perform steps as recited in claim 11.

13. A computer-implemented method comprising steps of:
receiving input comprising a search query that was performed while the search engine was operating in a particular mode of a plurality of operational modes;
wherein the plurality of operational modes includes (a) a mode that is designed to filter offensive material and (b) a mode that is designed not to filter offensive material;
recording an indication that the search query was received while the search engine was in the particular mode;
determining the numbers of times the search query was received in each mode of a plurality of modes;
calculating a ratio of (a) a number of times that the search query was received while the search engine was in the mode in which offensive material was being filtered from search results to (b) a number of times that the search query was received while the search engine was in the mode in which offensive material was not being filtered from search results; and
in response to a determination that the ratio is less than a specified threshold, storing data that indicates that the search query is a search query that should return offensive items as search results;
wherein said steps are performed by one or more computing devices.

14. A volatile or non-volatile non-transitory machine-readable storage medium storing instructions which, when executed by one or more processors, cause the one or more processors to perform steps as recited in claim 13.

15. The method of claim 13, wherein the mode in which offensive material is not filtered from search results is not a selected mode by default, and does not become an active mode until a user indicates that the user desires to view search results from which offensive material has not been filtered.

16. A volatile or non-volatile non-transitory machine-readable storage medium storing instructions which, when executed by one or more processors, cause the one or more processors to perform steps as recited in claim 15.

17. The method of claim 13, wherein the input is a first input, further comprising receiving a second input to change an active mode of the search engine from one of (a) the mode that is designed to filter offensive material or (b) the mode that is designed not to filter offensive material, to another of (a) the mode that is designed to filter offensive material or (b) the mode that is designed not to filter offensive material.

18. A volatile or non-volatile non-transitory machine-readable storage medium storing instructions which, when executed by one or more processors, cause the one or more processors to perform steps as recited in claim 17.

19. The method of claim 13, wherein the specified threshold is a first threshold, further comprising:

performing the steps of receiving, recording, determining, and calculating for a plurality of search queries that were performed while the search engine was operating in particular modes of the plurality of operational modes;

in response to a determination that a calculated ratio for a particular search query of the plurality of search queries is greater than a second threshold, storing data that indicates that the search query is a search query that should not return offensive items as search results.

20. A volatile or non-volatile non-transitory machine-readable storage medium storing instructions which, when executed by one or more processors, cause the one or more processors to perform steps as recited in claim 19.

* * * * *